Figure 1:
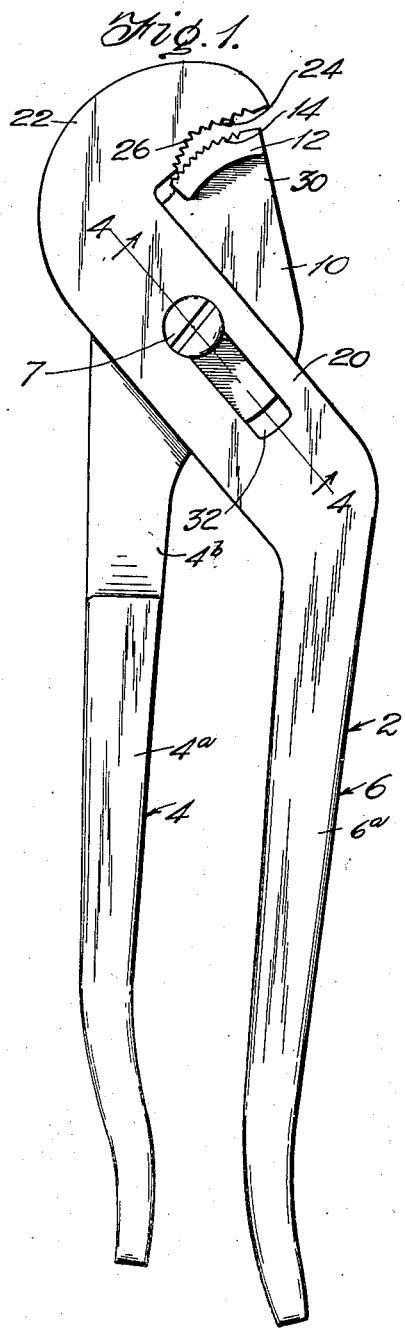

March 28, 1939.  R. W. PALMER ET AL  2,152,563
SLIP LOCKING PIVOT
Filed June 1, 1937  2 Sheets-Sheet 1

Inventors
ROBERT W. PALMER,
JOHN P. PALMER,
By Kimmel & Crowell,
Attorneys

March 28, 1939.  R. W. PALMER ET AL  2,152,563
SLIP LOCKING PIVOT
Filed June 1, 1937      2 Sheets-Sheet 2
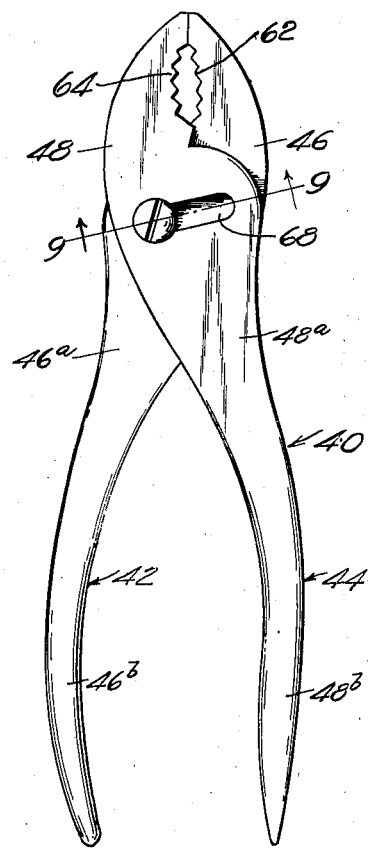
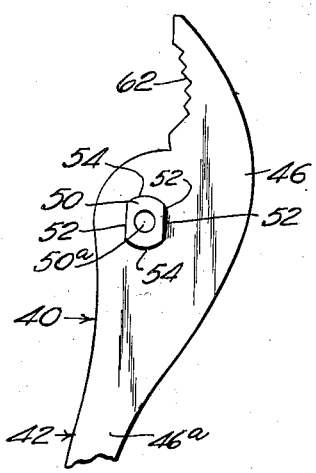
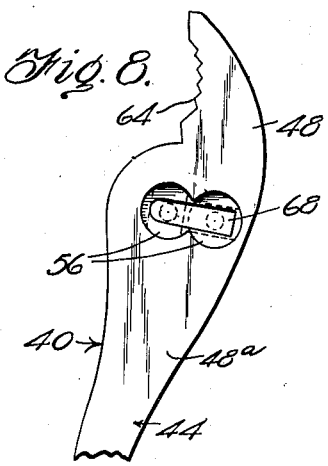
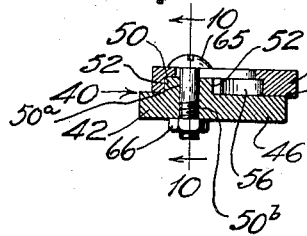
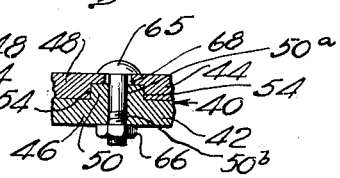
Inventors
ROBERT W. PALMER,
JOHN P. PALMER,
By Kimmel & Crowell
Attorneys Patented Mar. 28, 1939

2,152,563

UNITED STATES PATENT OFFICE 2,152,563

SLIP LOCKING PIVOT

Robert W. Palmer and John P. Palmer, Meadville, Pa.

Application June 1, 1937, Serial No. 145,846

1 Claim. (Cl. 81—51.3)

This invention relates to a slip locking pivot for a gripping tool or the like, more particularly, but not by way of limitation to a slip locking pivot for a pair of pliers.

In pliers or like gripping tools, it has been found that when the bolt constituting the connecting means for holding the gripping elements together is subjected to undue stress or strain, upon application of the gripping members on the work it has a tendency to shear or twist beyond its torsional limit and thus render the tool unserviceable.

It is therefore an important object of this invention to provide a slip locking pivot for a gripping tool or the like mounted on the connection means for the gripping elements and which eliminates all possibility of undue torsional twist on said connection means when the tool is active.

It is a further object of the invention to provide a gripping tool of that type including a pair of correlated connected members, one provided with an elongated slot and the other carrying a pivot for extension into the slot to coact with selected portions of the side wall of the latter whereby the tool may be adjusted to a plurality of positions and when active preventing excessive strain on the connection means for said members.

A still further object of the invention is to provide a gripping tool, in a manner as hereinafter set forth, which is of a simplified construction, inexpensive to manufacture, durable and capable of efficient operation at all times.

With the foregoing and other objects in view, the invention consists of a novel construction, combination and arrangement of parts as will be more specifically referred to and as illustrated in the accompanying drawings wherein is shown an embodiment of the invention, but it is to be understood that changes, variations and modifications may be resorted to which fall within the scope of the invention as claimed.

Figure 2:
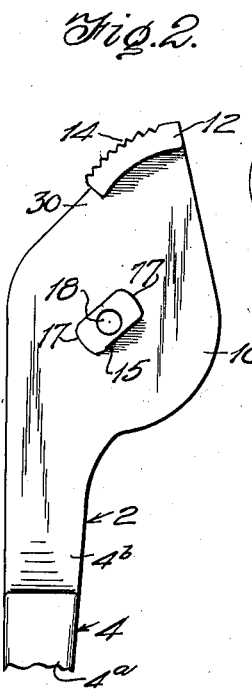
Figure 3:
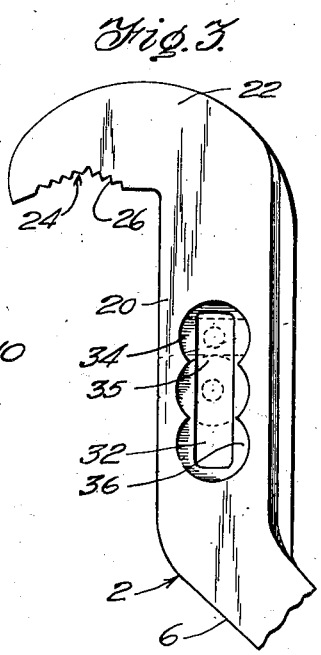
Figure 4:
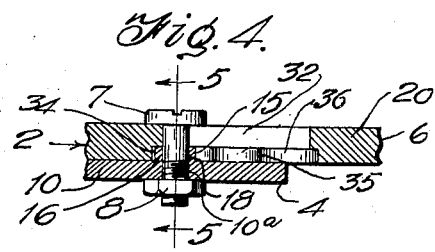
Figure 5:
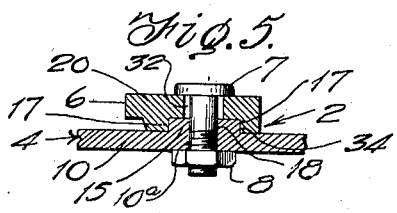

In the drawings:

Figure 1 is a side elevation of a gripping tool in accordance with this invention, Figure 2 is a fragmentary view in elevation looking towards the inner face of one of the combined jaw and handle forming elements of the tool, Figure 3 is a fragmentary view in elevation looking towards the inner face of the other combined jaw and handle forming element of the tool, Figure 4 is a section on line 4—4, Figure 1, Figure 5 is a section on line 5—5, Figure 4, Figure 6 is a side elevation of a modified form of tool in accordance with this invention, Figure 7 is a fragmentary view in elevation looking towards the inner face of one of the combined jaw and handle forming elements of the form of tool shown in Figure 6, Figure 8 is a fragmentary view in elevation looking towards the inner face of the other combined jaw and handle forming element of the form of tool shown in Figure 6, Figure 9 is a section on line 9—9, Figure 6, and Figure 10 is a section on line 10—10, Figure 9.

Referring to Figures 1 to 5 of the drawings, the tool illustrated thereby is of the pliers type, generally indicated at 2 and includes a pair of combined jaw and handle forming elements, generally indicated at 4, 6 respectively and suitably connected together intermediate their ends. The connection means between elements 4, 6 may be any suitable form and are shown by way of example as a threaded headed bolt 7 and a nut 8. The element 4 includes a hand grip portion 4ª of any suitable cross sectional contour, a shank portion 4ᵇ and a jaw portion 10. The portions 4ª, 4ᵇ and 10 will be hereinafter termed respectivey a hand grip, a shank and a jaw. The shank 4ᵇ is straight. The shank 4ᵇ as well as the major part of the jaw 10 is of materially less thickness than that of the hand grip 4ª. The latter at its outer end merges into the inner end of the shank 4ᵇ. The jaw 10 is of greater width than the shank 4ᵇ and merges at its inner end into the outer end of such shank 4ᵇ. The jaw 10 is enlarged as at 12 for a portion of the length at its outer end. The enlargement is of arcuate contour and provided on its outer lengthwise edge with teeth 14.

The element 6 includes a hand grip portion 6ª, a shank portion 20 and a jaw portion 22. The portions 6ª, 20 nd 22 will be hereinafter termed respectively a hand grip, a shank and a jaw. The shank 20 is disposed at an outward inclination with respect to the outer end of the hand grip 6ª. The shank 20 is of materially less thickness than the hand grip 6ª and the jaw 22. The jaw 22 extends from the shank 20 in an opposite direction with respect to the direction in which the shank 20 extends from the hand grip 6ª.

The outer side faces of the portions 4ª, 4ᵇ and 20 of the element 4 are flush with each other. The outer side faces of the portions 6ª, 20 and 22 of the element 6 are flush with each other.

The jaw 22 has its inner edge formed with a concave recess 24 and with the wall of the recess provided with teeth 26. The jaw 22 merges into the outer end of the shank 20 and the outer end of the hand grip 6ª merges into the inner end of the shank 20. The latter is disposed at an angle of substantially 45° with respect to the outer end of a hand grip 6ª of element 6. The teeth 14 coact with the teeth 26 to constitute gripping means when the tool is applied to the work.

The jaw 10 of the element 4 is formed substantially centrally thereof with an opening 10ª. The jaw 10 is provided on its inner face with a pivot which may or may not be integral therewith. The pivot is indicated at 15 and as shown is integral with the inner face of jaw 10. The pivot 15 is substantially of rectangular contour and has its end edges 17 of oppositely disposed arcuate curvature. The pivot 15 is disposed at an inclination with respect to the inner face of jaw 10 and is formed with an opening 18 having its wall flush with the wall of opening 10$^a$.

The shank 20 of the element 6 is provided intermediate its ends with an elongated slot 32 having its lengthwise walls parallel to the edges of shank 20. The inner face of the shank 20 bordering the side and end walls of the slot 32 is mortised to provide a set of circular socket-like seats intersected by the slot 32. The seats are three in number and indicated at 34, 35 and 36. The seats 34 and 36 are the outer and the seat 35 is the central seat of the set. The seats communicate with each other and extend from the side and end walls of the slot 32. The diameter of each of the seats is slightly greater than the length of the pivot 15. The width of the pivot 15 is slightly greater than the width of the slot 32.

The bolt 7 extends through the slot 32 in shank 20, the opening 18 in pivot 15 and the opening 10$^a$ in jaw 10. The head of the bolt abuts the outer face of shank 20. The nut 8 which associates with the bolt 7 to provide the connection means for the elements 4 and 6 is arranged against the outer face of jaw 10. The shank of the bolt 7 provides a bearing for the jaw 10 of element 4 and the pivot 15 on the inner face of jaw 10.

When the elements 4 and 6 are connected together the shank 20 of element 6 extends against the inner face of the jaw 10 of element 4 adjacent the inner end of the enlargement 12 on jaw 10. The pivot 15, bolt 7, slot 32 and seats 34, 35 and 36 provide for the slidably adjusting of the element 4 relative to the element 6 whereby the jaw 10 can be adjusted relative to the jaw 22 to provide for the tool being used in connection with different size work. The pivot 15 coacts with a selected seat for locking the element 4 when in adjusted position relative to element 6 and when pivot 15 is in its locking position it is disposed diametrically within the selected seat to have its end edges oppose aligned parts of the wall of the seat. The said parts of the wall of the selected seat coact with the end edges of and prevent the pivot 15 from moving out of the selected seat until the element 6 is adjusted relative to element 4 in a manner to be referred to. When releasing pivot 15 from the seat in which it is arranged for the purpose of arranging it in another seat. The element 6 is moved in an anti-clockwise direction on element 4 to an extent to position the slot 32 to extend in a direction corresponding to that of pivot 15, after which the element 6 is shifted across element 4 to an extent to position the other seat, in which the pivot 15 is to be arranged at the latter. The element 6 is then shifted in a clockwise direction on element 4 to an extent to dispose the slot 32 at an angle to the pivot 15 whereby the end edges of the pivot 15 will oppose aligned parts of the selected seat which provides for the locking of the pivot relative to the seat in which it is arranged.

It is apparent from the construction and arrangement of the seats that they will cooperate with the pivot 15 to provide three selected adjustments between the jaws 22 and 10.

The pivot 15 in cooperation with the selected seat, not only provides an adjustable interfitting means for the elements 4 and 6, but further provides for the pivot to relieve any strain or torsional stress upon the bolt 7 which connects the elements 4 and 6 together. It is readily apparent upon application of the tool to the work that the bolt 7 does not receive any torsional pressure which would tend to shear the bolt upon its torsional limit. The strain or pressure of the load is fully taken up by the interfitting of the pivot 15 with a selected seat.

With respect to the modified form shown in Figures 6 to 10, the tool shown is of the pliers type, is generally indicated at 40 and includes a pair of coupled together combined jaw and handle forming elements 42, 44 provided with jaws 46, 48 respectively, shanks 46$^a$, 48$^a$ respectively and hand grips 46$^b$, 48$^b$ respectively. The inner edges of the jaws 46, 48 are teethed as at 62, 64 respectively.

The shank 46$^a$ of the element 44 in proximity to the jaw 48 is provided transversely thereof with an inclined slot 68. The inner face of shank 46$^a$ bordering the walls of the slot 68 is mortised to form a pair of circular seats 56 communicating with each other and intersected by the slot 68.

The inner face of jaw 46 between its lengthwise median and one side is provided with a pivot which may or may not be integral therewith, but as shown the pivot which is indicated at 50 is integral with jaw 46. The pivot 50 is substantially of rectangular contour and is formed with straight side edges 52 and oppositely disposed end edges 54 of arcuate contour. The pivot 50 is formed with a central opening 50$^a$. The jaw 46 is formed with an opening 50$^b$ which has its wall aligned with the wall of the opening 50$^a$.

The elements 42, 44 are suitably connected together and a means for such purpose is shown by way of example as the bolt 65 and a nut 66. The bolt 65 and nut 66 are arranged with respect to the elements 42, 44 in a similar manner as the bolt 7 and nut 8 are arranged with respect to the elements 4 and 6.

The pivot 50 corresponds in form to that of the pivot 15 and functions in the same manner as the pivot 15, with this exception that the seats 56 and pivot 50 provide for two adjustments whereas the pivot 15 and seats 34, 35 and 36 provide for three adjustments.

What we claim is:

A pliers comprising a pair of handles, a relatively wide obtusely disposed extension integral with one of said handles, a jaw carried by said extension, an obtusely disposed extension integral with the other handle and disposed at substantially right angles to said first extension, a jaw carried by said second extension, a substantially rectangular shaped lug integral with said first extension and extending laterally of one side thereof, the longitudinal axis of said lug being disposed parallel with the length of said first extension, said lug having rounded opposite ends, said second extension having an elongated slot therethrough having parallel sides thereof parallel with the sides of said second extension, said second extension also having a plurality of peripherally communicating circular sockets in a selected one of which said lug is adapted to engage, and a bolt extending through said lug and said slot for holding said extensions together, the width of said slot being substantially equal to the diameter of said bolt.

ROBERT W. PALMER.
JOHN P. PALMER.